United States Patent [19]

Hess

[11] 4,115,142
[45] Sep. 19, 1978

[54] PIGMENTARY BRIGHT PRIMROSE YELLOW MONOCLINIC BISMUTH VANADATE AND PROCESSES FOR THE PREPARATION THEREOF

[75] Inventor: Richard William Hess, Wilmington, Del.

[73] Assignee: E. I. Du Pont de Nemours and Company, Wilmington, Del.

[21] Appl. No.: 794,391

[22] Filed: May 9, 1977

Related U.S. Application Data

[63] Continuation-in-part of Ser. No. 698,692, Jun. 22, 1976, abandoned.

[51] Int. Cl.$^2$ .............................................. C09C 1/00
[52] U.S. Cl. ................................. 106/288 B; 423/593
[58] Field of Search ........................... 106/288 B, 309; 423/593

[56] References Cited

FOREIGN PATENT DOCUMENTS 422,947 12/1925 Fed. Rep. of Germany.

OTHER PUBLICATIONS

H. E. Swason et al., Standard X-Ray Diffraction Powder Patterns, National Bureau of Standards Report, No. 7592, Aug. 1962.

R. S. Roth et al., Synthesis and Stability of Bismutotantalite; Stibiotantalite and Chemically Similar $ABO_4$ Compounds, *The American Mineralogist*, vol. 48, (Nov.-Dec., 1963), pp. 1348–1356.

I. M. Gottlieb et al., Preparation and Thermal Properties of Bismuth Orthovanadate, *Thermal Analysis*, vol. 2, Proceedings Third ICTA DAVOS 1971, pp. 303–311.

I. M. Gottlieb and D. P. Kelly, Further Studies on the Preparation and Thermal Properties of Bismuth Orthovanadate, *Thermal Analysis*, vol. 1, Proceedings Fourth ICTA Budapest, (1974), pp. 675–679.

*Primary Examiner*—Winston A. Douglas
*Assistant Examiner*—J. V. Howard

[57] ABSTRACT

A pigmentary, bright primrose yellow monoclinic bismuth vanadate and processes for the preparation thereof by reacting bismuth nitrate with an alkali vanadate under controlled conditions to obtain a bismuth vanadate gel followed by aqueous digestion or calcination to produce pigmentary, bright primrose yellow monoclinic bismuth vanadate.

18 Claims, No Drawings

PIGMENTARY BRIGHT PRIMROSE YELLOW MONOCLINIC BISMUTH VANADATE AND PROCESSES FOR THE PREPARATION THEREOF

CROSS REFERENCE TO RELATED APPLICATION

This application is a continuation-in-part of my application Ser. No. 698,692, filed June 22, 1976, now abandoned.

BACKGROUND OF THE INVENTION

This invention relates to pigmentary bright primrose yellow monoclinic bismuth vanadate and processes for the preparation thereof.

A pigment is an insoluble small particle solid which is incorporated in paints, plastics, and inks to impart color and/or opacity. Ideally, a pigment should have strength, that is, a low color pigment requirement when mixed with a white pigment to make tints; intensity, that is, purity of shade or absence of dullness or greyness; lightfastness, that is, resistance to color change when exposed to sunlight in a pigmented article; and resistance to bleed, that is, low migration of color in a pigmented article. In addition, for many applications, it is desirable that a pigment have good hiding power, that is, ability to efficiently opacify a pigmented article.

The major intense yellow pigments currently used are lead chromate, cadmium sulfide, nickel titanate, and a number of organic materials such as certain azo compounds. Lead chromate and cadmium sulfide have good hiding; however, at present there is a trend away from using these compounds as pigments because of their possible toxicity. Nickel titanate has good hiding power but it does not have the strength and high intensity desired in a high-performance pigment. The organic pigments generally exhibit high strength but poor hiding and frequently poor bleed resistance.

Thus, there is a need for a nontoxic, high hiding, yellow pigment which also has good strength, high intensity, good lightfastness, and no bleed in organic solvents or vehicles.

Bismuth vanadate occurs in nature in an orthorhombic form commonly called pucherite. Pucherite is a dull yellow-brown mineral, which is not useful as a pigment. Pucherite is similar in color to limonite, a dull yellow-brown iron oxide, which has never been produced as a bright, high intensity pigment despite repeated attempts.

Various references have described the synthetic preparation of bismuth vanadate, for example, I. M. Gottlieb and C. R. Rowe, "Preparation and Thermal Properties of Bismuth Orthovanadate," *Thermal Analysis*, Vol. 2, Proceedings Third ICTA DAVOS (1971), pp. 303-311; R. S. Roth and J. W. Waring, "Synthesis and Stability of Bismutotantalite, Stibiotantalite and Chemically Similar ABO$_4$ Compounds," *The American Mineralogist*, Vol. 48 (Nov.-Dec., 1963), pp. 1348-56; H. E. Swanson et al., "STandard X-Ray Diffraction Powder Patterns," *National Bureau of Standards Report*, No. 7592 (Aug., 1962); Eduard Zintl and Ludwig Vanino, "Process For The Manufacture Of Pure Bismuth Vanadate"; German Pat. No. 422,947 (1925). However, as in the case of yellow iron oxide, none of the above were successful in preparing bismuth vanadate as a bright yellow pigment.

SUMMARY OF THE INVENTION

In accordance with the present invention, there is provided a pigmentary monoclinic bismuth vanadate which is primrose yellow in shade, is nontoxic, and has high hiding, good strength, high intensity, good lightfastness, and no bleed in organic solvents or vehicles. This pigmentary bright primrose yellow bismuth vanadate has a pure monoclinic crystal structure as determined by X-ray diffraction, exhibits an increase in reflectance from 450 to 525 nm of at least about 65 units using Type I illumination and a green filter reflectance in paint of about 60% (preferably 64%), has a surface area of about 2-22 m$^2$/g, and a masstone lightfastness in paint such that it loses about 11% or less reflectance during 44 hours Fade-Ometer ® exposure.

There is also provided a process for preparing the bismuth vanadate pigment of this invention, which process comprises mixing a solution of Bi(NO$_3$)$_3$.5H$_2$O in nitric acid with a solution of alkali vanadate, preferably Na$_3$VO$_4$, in an aqueous base selected from sodium hydroxide and potassium hydroxide while controlling the mixing conditions to assure equimolar incremental combination of the solutions under turbulent conditions to obtain bismuth vanadate gel suspended in a solution containing dissolved alkali nitrate; the molar ratio of Bi$^{3+}$ to VO$_4^{3-}$ in this suspension is from about 0.95:1.00 to 1.10:1.00 and the normalities of the acid and base solutions are adjusted prior to mixing so that the pH of the suspension will be about 1.0 to 8.0 and preferably 1.5 to 2.0; adjusting, if necessary, the pH of the suspension to about 1.9-3.6 with an alkali hydroxide selected from sodium hydroxide or potassium hydroxide or as the case may be with an acid selected from nitric acid or sulfuric acid; separating the gel from the suspension; washing the gel with water until it contains about 20% or less alkali nitrate based on the theoretical yield of bismuth vanadate; and calcining the gel at about 200°-500° C. for from about 0.4 hour to about 3 hours.

DETAILED DESCRIPTION OF THE INVENTION

This invention relates to a pigmentary monoclinic bismuth vanadate and processes for the preparation thereof. The pigmentary bismuth vanadate is bright primrose yellow and has high intensity, good strength, and good lightfastness.

The pigmentary bismuth vanadate of the present invention is entirely in the monoclinic crystal phase as determined using X-ray diffraction. X-ray diffraction measurements are made with a Debye-Scherrer powder camera using Cu$_{K\alpha}$ radiation from a Norelco Type 12045B unit at 40 kV/20mA and a 6-hour exposure.

The pigmentary bismuth vanadate of the present invention exhibits a large increase in reflectance in the range of the visible spectrum between 450-525 nm which shows that it is primrose yellow in color and has high intensity and good strength. Reflectance as used herein is a comparison of the specular and diffuse reflectance of a known standard with the sample to be tested using Type I illumination. Reflectance is measured on a Cary Model 14 spectrophotometer equipped with an integrating sphere, painted with Eastman white reflectance paint No. 6080. The sample to be tested is prepared by mixing 10 weight percent of the bismuth vanadate of the present invention with 90 weight percent of barium sulfate, Eastman Reflectance Standard No. 6091, until a uniform powder is obtained. Then the reflectance of the known standard, Eastman Reflectance Standard No. 6091, is compared with that of the sample. In the range of the visible spectrum from 450 to 525 nm, the sample containing the pigmentary bismuth vanadate of the present invention exhibits an increase of at least about 65 reflectance units on a scale in which the Eastman Reflectance Standard No. 6091 exhibits a reflectance of 100 units over the entire visible spectrum. In fact, many of the samples exhibit increases in reflectance of at least about 70 units or greater. The greater the magnitude of the change in reflectance within the specified spectral range, the greater the intensity and strength of the sample.

The intensity and lightfastness of the bismuth vanadate pigment in a paint are measured from paint drawdowns made to complete hiding. The paint is made by dispersing the pigment into a binder in a 2:1 ratio by weight of pigment to binder using a Hoover muller. The binder is composed of 98.9 parts by weight #2 transparent varnish made by the Superior Varnish and Drier Company, Merchantsville, N.J., 1 part by weight as lead, of lead Nuodex ® drier (contains 24% lead), and 0.1 part by weight as manganese, of manganese Nuodex ® drier (contains 6% manganese). The drawdowns are dried for about 72–120 hours in a well-ventilated room at 25° C. and less than about 50% humidity.

Intensity is determined by the green filter reflectance of a masstone drawdown. Intensity is expressed as a percent of green filter reflectance measured with a Gardiner Multipurpose Reflectometer, Serial No. 40, (Gardiner Laboratory, Inc., Bethesda, Md.) using a white reflectance standard at a setting of 86.1 and light from a General Electric CVS projector lamp passed through the green tristimulus filter supplied with the Gardiner Reflectometer. The Gardiner Multipurpose Reflectometer is described in National Bureau of Standards Research Paper RP 1345, dated November, 1940, by Richard S. Hunter, and National Bureau of Standards Circular C429, dated July 30, 1942, by Richard S. Hunter. The higher the percent reflectance of the drawdown, the more intense the color. The intensity of the bismuth vanadate of the present invention is such that it has a green filter reflectance of at least about 60%, preferably 64%.

Lightfastness is determined after the dried paint drawdowns have been continuously exposed for 44 hours in an Atlas Color Fade-Ometer ® Type FDA-P. A Gardiner Multipurpose Reflectometer is used as described above to measure green filter reflectance within one hour prior to and within 1 hour after exposure. The percent lowering of reflectance after exposure based on initial reflectance is percent Fade-Ometer ® darkening. The lower the percent Fade-Ometer ® darkening, the better the lightfastness of the pigment. The bismuth vanadate of the present invention will generally exhibit a percent Fade-Ometer ® darkening of about 11% or less, preferably about 7% or less, after 44 hours of exposure.

The surface area of the bismuth vanadate is about 2–22 $m^2/g$. For use in film forming compositions, such as paints and inks, a surface area of about 8–22 $m^2/g$. is preferred. For use in plastic compositions, a surface area of about 2–4 $m^2/g$. is preferred because of increased heat stability. The surface area is measured on a Perkin-Elmer Shell Model 212C Sorptometer using the technique recommended by the manufacturer.

Pigmentary bismuth vanadate is prepared by mixing a solution of up to about 0.8M $Bi(NO_3)_3 \cdot 5H_2O$ in up to about 4.0N nitric acid, preferably about 0.2M $Bi(NO_3)_3 \cdot 5H_2O$ in about 1.0N nitric acid, with a solution of alkali vanadate, preferably sodium vanadate in a concentration up to about 0.32M in up to about 1.6N aqueous base selected from sodium hydroxide and potassium hydroxide. Upper concentration limits for the reactant solution are determined by solubility; however, control of equimolar incremental mixing is easier with more dilute solutions. In a preferred embodiment a solution of about 0.2M $Na_3VO_4$ in about 1.0N aqueous sodium hydroxide is employed. The solutions are preferably mixed at a temperature of from about 20° to 30° C., but could be mixed at 10°–100° C.

The molar ratio of $Bi^{3+}$ to $VO_4^{3-}$ can be about 0.95:1.00 to about 1.10:1.00, preferably from about 0.98:1.00 to 1.02:1.00. As indicated, it has been found that slight molar excess of $Bi^{3+}$ or $VO_4^{3-}$ may be used.

The normalities of the acid and base solutions are adjusted prior to mixing so that the pH of the reaction mixture will be about 1.0–8.0. A pH of about 1.5–2.0 is preferred because it yields a gel from which pigmentary monoclinic bismuth vanadate product having optimum intensity and/or lightfastness can be obtained.

The preferred method of mixing the solutions is in a flow reactor which gives a very rapid incremental combination under high turbulence conditions. Incremental combination means that small, essentially stoichiometric quantities are reacted at one time. This prevents relatively large gradients and stoichiometric imbalance that result when large quantities of reactants are mixed at once. Such imbalance results in undesirable side reactions. Apparatus which conveniently achieve this result are tee mixers or flow reactors.

When the solutions of $Bi(NO_3)_3 \cdot 5H_2O$ and alkali vanadate are mixed under the above conditions, a suspension of bismuth vanadate gel in alkali nitrate (sodium nitrate, potassium nitrate, or both) solution is formed. Bismuth vanadate gel as used herein means a hydrous, X-ray amorphous bismuth vanadium oxide precipitate containing occluded water.

After formation of the gel the pH of the suspension must be adjusted to a pH of from 1.9 to 3.6 if the suspension pH is found to be outside of this range. Thus, if the pH of the suspension is less than about 1.9 it must be adjusted upward with aqueous sodium hydroxide or potassium hydroxide, and if it is greater than about 3.6 it must be adjusted downward with an acid selected from nitric acid or sulfuric acid.

Preferably the pH of the suspension will be adjusted to a pH of from 3.3 to 3.5 as this produces a gel which, when calcined, gives pigmentary monoclinic bismuth vanadate of desirable lightfastness and thermal stability. Prompt adjustment of the pH of the suspension to the final ranges listed above is advisable, although under some circumstances the bismuth vanadate gel is stable for up to several hours at room temperature prior to pH adjustment.

The gel is then removed from the suspension, preferably by filtration. The gel is collected and, if it contains more than about 20 percent alkali nitrate based on the theoretical yield of bismuth vanadate, the gel must be washed with water until it contains about 20 percent or less. Preferably, the alkali nitrate remaining in the gel will be about 5–7%.

The gel is then calcined at a temperature of about 200° to 500° C. for about 0.4–3 hours and preferably at about 380° to 460° C. for about one hour. The bismuth vanadate pigment is entirely in the monoclinic phase as identified by X-ray diffraction.

Another process for preparing pigmentary monoclinic bismuth vanadate comprises mixing a solution of up to about 0.8M $Bi(NO_3)_3 \cdot 5H_2O$, preferably about 0.2M, in aqueous nitric acid of up to 4.0N, preferably about 1.0N, with a solution of alkali vanadate (sodium vanadate or potassium vanadate), preferably up to about 0.32M $Na_3VO_4$, in up to about 1.6N aqueous base selected from sodium hydroxide or potassium hydroxide, more preferably about 0.2M $Na_3VO_4$ in about 1.0N sodium hydroxide. The solutions are preferably mixed at 20°–30° C., but could be mixed at 10°–100° C.

The molar ratio of $Bi^{3+}$ to $VO_4^{3-}$ can be about 0.90:1.00 to 1.10:1.00, preferably about 0.98:1.00 to 1.00:1.05, which indicates that either an excess of $Bi^{3+}$ or $VO_4^{3-}$ may be used. The symbol $VO_4^{3-}$ is used herein to denote a pentavalent vanadium species in an aqueous solution, but it does not mean a specific pentavalent vanadium species present at a given pH and vanadium concentration.

The normalities of the acid and base solutions are adjusted prior to mixing so that the pH of the reaction mixture will be about 1.0–11.0. A pH of about 1.5–4.0 is preferred because it yields a gel from which a pigmentary monoclinic bismuth vanadate product having optimum intensity and/or lightfastness can be obtained.

The solutions must be mixed in accordance with the mixing procedure described for the first process to achieve an equimolar incremental combination of the solutions under high turbulence conditions and result in a suspension of bismuth vanadate gel in alkali nitrate solution.

Preferably the gel should not be removed from the suspension until the pH of the suspension has been stabilized at about 2.2–6.0. Thus, if the pH of the suspension is less than about 2.2, it may be adjusted upward with aqueous sodium hydroxide or potassium hydroxide, and if it is greater than about 6.0, it may be adjusted downward with an acid selected from nitric acid or sulfuric acid. Prompt adjustment of the pH of the suspension to the final range listed above is advisable, although under certain circumstances the bismuth vanadate gel is stable for up to several hours at room temperature prior to pH adjustment.

The gel is then removed from the suspension, preferably by filtration. The gel is collected and, if it contains more than about 10 percent alkali nitrate based on the theoretical yield of bismuth vanadate, the gel must be washed with water until it contains about 10 percent or less.

The gel is then heated in water at a temperature of from about 60° to about 200° C. for at least 0.2 hour, and preferably at a temperature of from about 90° to about 100° C. for about one to two hours to convert the gel to pigmentary monoclinic bismuth vanadate. During the aqueous digestion the pH of the suspension should be maintained at a pH of from 2.2 to 6.0, and preferably from a pH of 3.0 to 3.5, by adding a suitable acid or base as needed. Acids suitable for use include nitric, sulfuric, hydrochloric, hydrobromic or phosphoric. Bases suitable for use include aqueous sodium hydroxide or potassium hydroxide. It will be understood that if temperatures above about 100° C. are used, the heating must be carried out under pressure. When an excess of vanadium is used, especially $Bi^{3+}$ to $VO_4^{3-}$ mole ratio range of 0.90–0.95:1.00, the pigment must be washed after the heating step by suspending it in water for 15 to 30 minutes at 50° to 100° C. while holding the pH at 8.0–9.5 with an aqueous base selected from sodium hydroxide and potassium hydroxide.

After digestion is complete the pigment is filtered and dried, e.g., at about 130° C. The product is bright primrose yellow bismuth vanadate which is entirely in the monoclinic phase as identified by X-ray diffraction.

In each of the above processes, the pH adjustment can be made after the gel has been removed from the suspension. However, in order to easily adjust the pH of the gel, the gel should be resuspended in water. Once the pH of the gel has been properly adjusted, the gel under certain circumstances is stable for up to about a week at room temperature.

In each of the above processes it is possible to prepare the alkali vanadate solutions by dissolving a pentavalent vandium compound such as $V_2O_5$, $Na_3VO_4$, $Na_4V_2O_7$, $NaVO_3$, or $K_3VO_4$ in an aqueous base selected from sodium hydroxide and potassium hydroxide.

After the bismuth vanadate pigment has been prepared by either of the aforementioned processes, its lightfastness may be improved by encapsulation in a dense amorphous coating of silica or a treatment with aluminum pyrophosphate. Coatings with silica can be applied in accordance with known processes, such as those taught in U.S. Pat. No. Re. 27,818 (reissue of U.S. Pat. No. 3,437,502) to Werner; U.S. Pat. Nos. 3,639,133 to Linton; 3,370,971 to Linton; and of U.S. Pat. No. 3,885,366 to Iler.

The following examples illustrate the present invention. All parts, percentages, and proportions are by weight unless otherwise specified.

EXAMPLE 1

Nine samples are prepared according to the following procedure:

A solution of $Na_3VO_4$ (7.58 g.) dissolved in 200 ml. 1.0N NaOH is poured, over about a two-minute period, into a stirring solution of $Bi(NO_3)_3 \cdot 5H_2O$ (20 g.) dissolved in 200 ml. of 1.0N $HNO_3$. The mixture is stirred vigorously and a fine yellow-orange percipitate is immediately formed. The pH of the mixture is then adjusted to 3.5 with 2.0N NaOH. The mixture is stirred for 0.5 hour, filtered, washed with 400 ml. of distilled water, and refiltered. A bismuth vanadate gel which remains on the filter paper is collected and calcined at 400° C. for one hour to produce pigmentary monoclinic $BiVO_4$.

The average green filter reflectance of these nine samples of bismuth vanadate is 68.0 and their average percent Fade-Ometer ® darkening after 44 hours of exposure is 11.0.

Eight samples are prepared according to the following procedure:

The procedure above is repeated except that the $Na_3VO_4$ dissolved in NaOH and the $Bi(NO_3)_3 \cdot 5H_2O$ dissolved in $HNO_3$ are combined by using a 1mm ID mixing tee at 40 psi over a period of about two minutes to obtain turbulent equimolar mixing.

The average green filter reflectance of these eight samples of bismuth vanadate pigment is 69.0 and their average percent Fade-Ometer ® darkening after 44 hours of exposure is 6.7.

This example shows that turbulent equimolar mixing improves the lightfastness of bismuth vanadate pigment.

EXAMPLE 2

A mixture is prepared by combining the following ingredients in a 1 mm ID mixing tee at 40 psi over a period of about 2 minutes:
(i) $Bi(NO_3)_3 \cdot 5H_2O$ (78.4 g.) dissolved in 200 ml. of 4.0N $HNO_3$, then diluted with 60 ml. of 2.0N $HNO_3$ and 545 ml. of water, and
(ii) $Na_3VO_4$ (30.3 g.) dissolved in 500 ml. of 1.6N NaOH, then diluted to 800 ml. with water.

Sufficient $HNO_3$ is added to ingredient (i) or aqueous NaOH to ingredient (ii) so that the pH of the mixture of the two will be within the range of about 1.5–2.0. The mixture is squirted into a three-liter beaker containing 1200 ml. of water adjusted to pH 2.3 with 0.5N $HNO_3$. The contents of the beaker are stirred for 1 minute and the pH is adjusted to 3.2 with 0.5N NaOH. Then the pH is adjusted to 3.4 and kept there for 30 minutes. The contents are filtered, washed with 250 ml of water, and again washed with 250 ml of water. After filtering, a bismuth vanadate gel is collected from the filter paper and is divided into three equal samples. Each sample is converted to pigmentary monoclinic $BiVO_4$ by the methods of Table I and tested for the listed properties.

TABLE I

| Sample | Method of Conversion | Lightfastness[1] % Fade-Ometer ® Darkening | Surface Area ($m^2/g$) |
|---|---|---|---|
| A | Washed with 250 ml of water, then boiled for 4 hours | 2.1 | 13.6 |
| B | Calcined at 390° C. for 1.5 hours | 4.7 | 6.8 |
| C | Calcined at 450° C. for 1.5 hours | 6.9 | 2.3 |

[1] Percent reflectance change after 44 hours of Fade-Ometer ® exposure

This shows that monoclinic bismuth vanadate pigment prepared by heating in water has better lightfastness than samples prepared by calcining. Further, bismuth vanadate pigment prepared by heating in water has a higher surface area which means that it has greater strength per unit weight than calcined samples.

EXAMPLE 3

A mixture is prepared by combining the following ingredients in a 1 mm ID mixing tee at 40 psi over a period of about 2 minutes:
(i) $Bi(NO_3)_3 \cdot 5H_2O$ (80.0 g.) dissolved in 204 ml. of 4.0N $HNO_3$, then diluted with 20 ml. of 2.0N $HNO_3$ and 581 ml. of water, and
(ii) $Na_3VO_4$ (30.3 g.) dissolved in 500 ml. of 1.6N NaOH, then diluted to 800 ml. with water.

Sufficient $HNO_3$ is added to ingredient (i) or aqueous NaOH to ingredient (ii) so that the pH of the mixture of the two will be about 1.5–2.0. The mixture is squirted into a 3-liter beaker containing 1200 ml. of water adjusted to a pH of 2.3 with 0.5N $HNO_3$. The contents of the beaker are stirred for one minute and the pH is adjusted to 3.2 with 0.5N NaOH. Then the pH is adjusted to 3.4 and kept there for 30 minutes. After filtering, a bismuth vanadate gel is collected from the filter paper and is divided into four equal samples. Samples A and B are not washed. Sample C is washed twice on the filter, each time with 250 ml. of water. Sample D is resuspended twice, each time with 500 ml. of water, refiltering each time. Each sample is converted to monoclinic bismuth vanadate by calcining at 450° C. for 1 hour. (The exact amounts of water and method used to wash the bismuth vanadate gel should be adjusted so that the amounts of $NaNO_3$ specified in Table II remain in the samples).

TABLE II

| Sample | Amount of $NaNO_3$ in sample based on dry weight of pigment (%) | Surface Area ($m^2/g$.) |
|---|---|---|
| A | 44 | 1.4 |
| B | 44 | 1.4 |
| C | 10–20 | 3.5 |
| D | ~3 | 4.9 |

The results reported in Table II demonstrate the effect of residual sodium nitrate in the gel prior to calcining. As indicated above it has been observed that the surface area of the pigmentary bismuth vanadate prepared from the gel decreases as the amount of sodium nitrate in the gel increases with a corresponding decrease in strength per unit. Preferred particle size for thermal stability is 2–4 $m^2/g$.

EXAMPLE 4

A mixture is prepared by combining the following ingredients in a 1 mm ID mixing tee at 40 psi over a period of about 2 minutes:
(i) $Bi(NO_3)_3 \cdot 5H_2O$ (80.0 g.) dissolved in 204 ml. of 4.0N $HNO_3$, then diluted with 20 ml. of 2.0N $HNO_3$ and 581 ml. of water, and
(ii) $Na_3VO_4$ (30.3 g.) dissolved in 500 ml. of 1.6N NaOH, then diluted to 800 ml. with water.

Sufficient $HNO_3$ is added to ingredient (i) or aqueous NaOH to ingredient (ii) so that the pH of the mixture of the two will be about 1.5–2.0. The mixture is squirted into a 3-liter beaker containing 1200 ml. of water adjusted to pH 2.3 with 0.5N $HNO_3$. The contents of the beaker are stirred for one minute and the pH is adjusted to 3.2 with 0.5N NaOH. Then the pH is adjusted to 3.4 and kept there for 30 minutes. The contents, a suspension of bismuth vanadate gel, are filtered and washed on the filter with two 500 ml. portions of water. After filtering, the bismuth vanadate gel which is collected from the filter paper is converted to monoclinic bismuth vanadate by calcining at 450° C. for one hour. This material is labelled Sample A.

Sample B is prepared according to the procedure used for Sample A, except that after the suspension is filtered, the gel is resuspended in 500 ml. of water, filtered, again resuspended in 500 ml. of water, and refiltered.

Sample C is prepared by resuspending 10 g. of Sample A in 500 ml. of water, filtering, again suspending in 500 ml. of water, filtering, and drying at 140° C.

Table III shows the relative heat stability of the pigment in plastic with varying sodium nitrate content.

TABLE III

| Sample | Amount of $NaNO_3$ in sample based on dry weight of pigment (%) | Relative Heat[1] Stability of the Pigment in Plastic |
|---|---|---|
| A | 6.4 | Most stable |
| B | 0.9 | Less stable than A but more stable than C |
| C | 0 | Less stable than A or B |

TABLE III-continued

| Sample | Amount of NaNO₃ in sample based on dry weight of pigment (%) | Relative Heat[1] Stability of the Pigment in Plastic |
|---|---|---|
| D | 44* | Least stable |

[1]Heat stability tests performed separately in polystyrene and in ABS using a Brabender Plastograph Type PL 4000 with a Banbury head. For polystyrene, the BiVO₄ is dispersed into the polystyrene at 205° C. at 40 rpm's for 5 minutes, heated to 316° C. and held there for 15 minutes at 100 rpm's. For ABS, the BiVO₄ is dispersed into the ABS at 205° C. at 40 rpm's for 5 minutes, heated to 260° C. and held there for 10 minutes at 100 rpm's. Lack of stability is indicated by darkening.
*The washing step to remove NaNO₃ was not performed in the preparation of this sample.

The results reported in Table III demonstrate that the absence of sodium nitrate in the gel prior to calcination has an adverse affect on the heat stability of the bismuth vanadate produced by calcining the gel. When the results reported in Tables II and III are considered it will be appreciated that control of the sodium nitrate level in the gel prior to calcining is essential to the production of high quality pigmentary bismuth vanadate, particularly when heat stability for use in pigmentation of plastics is desired.

EXAMPLE 5

A mixture is prepared by combining the following ingredients in a mixing tee:
(i) $Bi(NO_3)_3.5H_2O$ (10.731 lb.) dissolved in 12.78 l. of 4.0N $HNO_3$, then diluted to 51.1 l. with water, and
(ii) $V_2O_5$ (2.049 lb.) dissolved in 31.94 l. of water containing 7.210 lb. NaOH, then diluted to 51.1 l. with water to give a solution of sodium vanadate plus sodium hydroxide.

The mixing tee has inside diameters of 0.118 in. for the bismuth nitrate opening, 0.192 in. for the sodium vanadate opening, and 0.192 in. for the exit. The bismuth nitrate enters on the leg. The solutions are mixed in about 15 minutes when a pressure of about 15 psi is applied across the tee. Sufficient $HNO_3$ is added to ingredient (i) or aqueous NaOH to ingredient (ii) so that the pH of the mixture of the two will be about 1.5 to 2.0. The mixture is squirted into a 45 gal. tank containing 7 gal. of water which has been adjusted to a pH of 2.2 with $HNO_3$. The contents of the tank are stirred for several minutes, and the pH is adjusted to 3.2 with 2.0N NaOH. The contents are then stirred for 15 minutes, filtered, and washed with 20 gal. of water and refiltered. The bismuth vanadate gel is collected from the filter cloth, and is stirred into a tank containing 70 lb. of water, which has been adjusted to a pH of 3.1 with $HNO_3$. The contents of the tank are heated to 95° C. in about 40 minutes and held at that temperature and a pH of 3.1 for 120 minutes. The product, pigmentary bismuth vanadate, is isolated by filtration, washed twice with 20 gal. of water, and dried at 140° C.

The above procedure is repeated four times to yield about 28 lb. of pigment. Twenty-five pounds of the pigment are dispersed in 104 lb. of water containing 567 g. of Fischer 28% sodium silicate solution (40°–42° Baume) by passing it through a Gaulin Submicron Homogenizer, first at 2000 psi, and again at 5000 psi. The mixture is then heated to and held at 90° C. and adjusted to a pH of 9.6 with 2.0N NaOH. A solution of 14.497 lb. of Fischer 28% sodium silicate in 62.5 lb. of water is added to the mixture over a four-hour period. At the same time, a dilute sulfuric acid solution (2.299 lb. of concentrated sulfuric acid in 71.25 lb. of water) is added to the mixture at a rate such that the pH of the mixture drops to 9.4 in about 45 minutes. The pH of the mixture is immediately raised to 9.6 with 2.0N NaOH. This pH control procedure is continued over the four-hour silicate addition period.

After the 4-hour addition period, the pH is reduced to 9.0 with $H_2SO_4$, held there for 60 minutes, and then reduced to 7.0. Then, while the mixture is still at 90° C., a solution of 3.75 lb. of $Al_2(SO_4)_3.18H_2O$ in 15 lb. of water is added over a ten-minute period and the pH falls to 2.0–3.0. The pH is then raised to 6.0 with 2.0N NaOH in about 20 minutes. The product is filtered hot, washed twice with 30 gal. of water and dried at 140° C. Chemical analysis and electron micrographs show that the pigment particles have been coated with silica. Intensity and lightfastness measurements on the pigment before and after coating are shown in Table IV.

TABLE IV

| Before Coating | | After Coating | |
|---|---|---|---|
| Intensity % Green Filter Reflectance | Lightfastness[1] % Fade-Ometer® Darkening | Intensity % Green Filter Reflectance | Lightfastness[1] % Fade-Ometer® Darkening |
| 67.9 | 6.0 | 67.4 | 2.4 |

[1]Percent reflectance change after 44 hours of Fade-Ometer® exposures

This example shows that encapsulating pigmentary bismuth vanadate in silica improves its lightfastness as determined by Fade-Ometer® exposures.

EXAMPLE 6

A mixture is prepared by combining the following ingredients in a 1 mm ID mixing tee at 40 psi over a period of about 2 minutes:
(i) $Bi(NO_3)_3.5H_2O$ (40.0 g.) dissolved in 200 ml. of 2.0N $HNO_3$, then diluted to 405 ml. with water, and
(ii) $Na_3VO_4$ (15.16 g.) dissolved in 200 ml. of 2.0N NaOH, then diluted to 400 ml. with water.

Sufficient $HNO_3$ is added to ingredient (i) or aqueous NaOH to ingredient (ii) so that the pH of the mixture of the two will be about 1.5 to 2.0. The mixture is squirted into a 4-liter beaker containing 1200 ml. of water which has been adjusted to a pH of 3.0 with $HNO_3$. The contents of the beaker are stirred for one minute and the pH is adjusted to 3.4 with 0.5N NaOH. The mixture is then stirred for 15 minutes, filtered, washed with 500 ml. of water, and refiltered. A bismuth vanadate gel is collected from the filter paper, and is divided into two equal samples, Sample A and Sample B.

Sample A is stirred into a beaker containing 800 ml. of water and the pH of the mixture is adjusted to 3.3 to 3.4 with HBr or NaOH. The mixture is boiled for 90 minutes while the pH is held at 3.3 to 3.4. A bismuth vanadate pigment is isolated by filtration, washed with 500 ml. of water, and heated to 130° C. until dry.

Sample B is calcined in an open crucible at 400° C. for 90 minutes.

Sample C is prepared according to the procedure used for Sample A except that 42.0 g., instead of 40.0 g., of $Bi(NO_3)_3.5H_2O$ is used.

Sample D is prepared according to the procedure used for Sample B, except that 42.0 g. instead of 40.0 g. of $Bi(NO_3)_3.5H_2O$ is used.

Sample E is prepared by combining the following ingredients in a 1 mm ID mixing tee at 40 psi over a period of about 2 minutes:

(iii) $Bi(NO_3)_3 \cdot 5H_2O$ (88.0 g.) dissolved in 52 ml. of concentrated $HNO_3$ and 400 ml. of water, then diluted to 800 ml. with water, and (iv) $V_2O_5$ (15.0 g.) dissolved in 600 ml. of water containing 53.0 g. of NaOH, then diluted to 800 ml. with water to give a solution of sodium vanadate plus sodium hydroxide.

Sufficient $HNO_3$ is added to ingredient (iii) of aqueous NaOH to ingredient (iv) so that the pH of the mixture of the two will be about 1.5 to 2.0. The mixture is squirted into a 4-liter beaker containing 1200 ml. of water which has been adjusted to a pH of 2.2 with $HNO_3$. The contents of the beaker are stirred for one minute and the pH is adjusted to 3.3 with 0.5N NaOH. The mixture is then stirred for 15 minutes, filtered, washed with 500 ml. of water, and refiltered. A bismuth vanadate gel is collected from the filter paper and is stirred into a beaker containing 500 ml. of water. The pH of the mixture is adjusted to 3.3 to 3.4 with $HNO_3$ or NaOH and is boiled for 90 minutes while the pH is kept constant at 3.3 to 3.4. A bismuth vanadate pigment is isolated by filtration, washed with 500 ml. of water, and heated at 130° C. until dry.

Sample F is prepared according to the procedure used for Sample B, except that 44.0 g., instead of 40.0 g., of $Bi(NO_3)_3 \cdot 5H_2O$ is used.

Sample G is prepared according to the procedure used for Sample A, except that 46.0 g., instead of 40.0 g., of $Bi(NO_3)_3 \cdot 5H_2O$ is used.

Sample H is prepared according to the procedure used for Sample B, except that 46.0 g., instead of 40.0 g., of $Bi(NO_3)_3 \cdot 5H_2O$ is used.

Sample I is prepared by combining the following ingredients in a 1 mm ID mixing tee at 40 psi over a period of 2 minutes.

(v) $Bi(NO_3)_3 \cdot 5H_2O$ (72.0 g.) dissolved in 56 ml. concentrated $HNO_3$ and 400 ml. water, then diluted to 800 ml. with water, and (vi) $V_2O_5$ (15.0 g.) dissolved in 600 ml. water containing 53.30 g. NaOH, then diluted to 800 ml. with water to give a solution of sodium vanadate plus sodium hydroxide.

Sufficient $HNO_3$ is added to ingredient (v) or aqueous NaOH to ingredient (vi) so that the pH of the mixture of the two will be about 1.5 to 2.0. The mixture is squirted into a 4-liter beaker containing 1200 ml. of water which has been adjusted to a pH of 2.2 with $HNO_3$. The contents of the beaker are stirred for 1 minute and the pH is adjusted to 3.3 with 0.5N NaOH. The mixture is then stirred for 15 minutes and filtered. A bismuth vanadate gel is collected from the filter paper. The gel is stirred into a beaker containing 500 ml. of water and the pH of the mixture is adjusted to 3.1 with $HNO_3$ or NaOH. The mixture is boiled for 120 minutes while its pH is held at 3.1. The bismuth vanadate precipitate is isolated by filtration and resuspended in 400 ml. of water. The temperature is then raised to 50° C. and the pH raised to 8.0 and held there for 10 minutes. A bismuth vanadate pigment is isolated by filtration, washed with 500 ml. of water, and heated at 130° C. until dried.

Sample J is prepared by combining the following ingredients in a 1 mm mixing tee at 40 psi over a period of about 2 minutes:

(vii) $Bi(NO_3)_3 \cdot 5H_2O$ (72.0 g.) dissolved in 56 ml. of conc. $HNO_3$ and 400 ml. water, then distilled to 800 ml. with water, and (viii) $V_2O_5$ (15.0 g.) dissolved in 600 ml. water containing 53.30 g. NaOH, then diluted to 800 ml. with water to give a solution of sodium vanadate plus sodium hydroxide.

Sufficient $HNO_3$ is added to ingredient (vii) or aqueous NaOH to ingredient (viii) so that the pH of the mixture of the two will be about 1.5 to 2.0. The mixture is squirted into a 4-liter beaker containing 1200 ml. of water which has been adjusted to a pH of 2.2 with $HNO_3$. The contents of the beaker are stirred for 1 minute and the pH is adjusted to 3.3 with 0.5N NaOH and the mixture is stirred for 15 minutes, filtered, washed with 500 ml. of water, and refiltered. A bismuth vanadate gel is collected from the filter paper. The gel is calcined in an open crucible at 400° C. for 60 minutes.

The intensity and lightfastness of the above samples are compared in Table V.

TABLE V

| Samples | $Bi^{3+}$ to $VO_4^{3-}$ Molar Ratio | Intensity % Green Filter Reflectance | Lightfastness[1] % Fade-Ometer ® Darkening |
|---|---|---|---|
| Aqueous | | | |
| A | 1.00/1.00 | 71.2 | 4.5 |
| C | 1.05/1.00 | 69.0 | 6.4 |
| E | 1.10/1.00 | 73.9 | 8.0 |
| G | 1.15/1.00 | 74.2 | 14.5 |
| I | 0.90/1.00 | 61.7 | 4.7 |
| Calcined | | | |
| B | 1.00/1.00 | 75.0 | 6.4 |
| D | 1.05/1.00 | 78.4 | 7.9 |
| F | 1.10/1.00 | 78.2 | 10.0 |
| H | 1.15/1.00 | 76.4 | 12.5 |
| J | 0.90/1.00 | 54.9 | 15.1 |

[1]Percent reflectance change after 44 hours of Fade-Ometer ® exposure

The data reported in Table V demonstrates that preparation of bismuth vanadate by use of molar ratios outside the limits disclosed herein adversely affect the properties of the resultant bismuth vanadate and render the product nonpigmentary as defined herein.

EXAMPLE 7

Samples prepared in the previous examples were also characterized by reflectance spectra and differential thermal analysis (DTA) measurements. The results of these measurements, together with intensity values for drawdowns are given in Table VI.

TABLE VI

| Example | Sample | Increase in Powder Reflectance Units from 450 to 525 nm | Intensity % Green Filter Reflectance | DTA[1] Endothermic Peaks ° C | | | |
|---|---|---|---|---|---|---|---|
| 2 | A | 72 | 60.5 | 861 | 952 | | |
| 4 | C | 71 | 74.4 | | 944 | | |
| 6 | F | 75 | 78.2 | | 936 | | |
| 6 | E | 80 | 73.9 | 867 | 927 | 937 | 947 |

[1]Samples are run on a Du Pont 900 Thermal Analyzer using Pt-Rh (13%) thermocouples and platinum macro sample cups. Sample size is 20 mg. with 20.6 mg. of $Al_2O_3$ or 15 mg. sample with 15 mg. of $Al_2O_3$ was supplied by the vendor as a reference. Running conditions are: heating rate - 30° C./min.; ambient temperature to 1000° C.; atmosphere - air 25 ml./min.

EXAMPLE 8

A mixture is prepared by combining the following ingredients in a mixing tee:

(i) $Bi(NO_3)_3 \cdot 5H_2O$ (10.731 lbs.) dissolved in 12.78 liters of 4.0N $HNO_3$, then diluted to 51.1 liters with water, and (ii) $V_2O_5$ (2.049 lb.) dissolved in 31.94 liters of water containing 7.210 lb. NaOH, then diluted to 51.1 liters with water, to give a solution of sodium vanadate plus sodium hydroxide.

The mixing tee has inside diameters of 0.118 in. for the bismuth nitrate opening, 0.192 in. for the sodium vanadate opening, and 0.192 in. for the exit. The bismuth nitrate enters on the leg. The solutions are mixed in about 15 minutes when a pressure of about 15 psi is applied across the tee. Sufficient $HNO_3$ is added to ingredient (i) or aqueous NaOH to ingredient (ii) so that the pH of the mixture of the two will be about 1.5 to 2.0. The mixture is squirted into a 45 gal. tank containing 7 gal. of water which has been adjusted to a pH of 2.2 with $HNO_3$. The contents of the tank are stirred for several minutes, and the pH is adjusted to 3.2 with 2.0N NaOH. The contents are then stirred for 15 minutes, filtered and washed with 20 gal. of water and refiltered.

Six 100 g. samples are suspended in six 300 ml. portions of water. The pHs of the suspensions are adjusted to the values indicated in Table VII by additions of $HNO_3$ or NaOH as necessary and held at the indicated pH for about 15 minutes. The suspensions are then filtered, the gel is removed and calcined for 1 hour at 400° C. The crystal phase, intensity and lightfastness are measured and reported in Table VII.

TABLE VII

| Sample | pH | Phase | Intensity % Green Filter Reflectance | Light fastness [1] % Fade-Ometer ® Darkening |
|---|---|---|---|---|
| A | 1.5 | Tetra & Mono | 53.3 | 31.9 |
| B | 2.0 | Monoclinic | 71.6 | 8.0 |
| C | 2.5 | Monoclinic | 73.0 | 8.6 |
| D | 4.0 | Monoclinic | 75.2 | 13.4 |
| E | 6.0 | Mono & 2nd Phase | 72.6 | 17.5 |
| F | 8.0 | Mono & 2nd Phase | 65.7 | 24.4 |

[1] Percent reflectance change after 44 hours of Fade-Ometer ® exposure.

What is claimed is:

1. A pigmentary bright primrose yellow monoclinic bismuth vanadate.

2. The bismuth vanadate of claim 1 which when uniformly mixed with 90 weight percent barium sulfate exhibits, in the visible spectrum, from 450 to 525 nm, an increase of at least about 65 reflectance units on a scale in which the barium sulfate exhibits a reflectance of 100 units over the entire visible spectrum.

3. The bismuth vanadate of claim 2 wherein the increase in powder reflectance is at least about 70 units.

4. The bismuth vanadate of claim 1 wherein the lightfastness in paint is such as to give a reflectance drop of less than about 11 percent in 44 hours in Fade-Ometer ® exposure.

5. The bismuth vanadate of claim 1 wherein the lightfastness in paint is such as to give a reflectance drop of less than about 7 percent in 44 hours of Fade-Ometer ® exposure.

6. The bismuth vanadate of claim 1 wherein the intensity in paint is such as to give a green filter reflectance of at least about 60 percent.

7. The bismuth vanadate of claim 1 wherein the intensity in paint is such as to give a green filter reflectance of at least about 64 percent.

8. The bismuth vanadate of claim 2 wherein the lightfastness in paint is such as to give a reflectance drop of less than about 7% in 44 hours of Fade-Ometer ® exposure, and the intensity in paint is such as to give a green filter reflectance of at least about 60%.

9. The bismuth vanadate of claim 3 wherein the lightfastness in paint is such as to give a reflectance drop of less than about 7% in 44 hours of Fade-Ometer ® exposure, and the intensity in paint is such as to give a green filter reflectance of at least about 64%.

10. A process for preparing a pigmentary bright primrose yellow monoclinic bismuth vanadate comprising:
A. mixing a solution of $Bi(NO_3)_3.5H_2O$ in nitric acid with a solution of alkali vanadate in an aqueous base selected from sodium hydroxide and potassium hydroxide, to precipitate a bismuth vanadate gel suspended in a solution containing dissolved alkali nitrate, wherein the molar ratio of $Bi^{3+}$ to $VO_4^{3-}$ is from about 0.95:1.00 to 1.10:1.00, and wherein the normalities of the acid and base solutions are adjusted prior to mixing so that the pH of the mixture will be from about 1.0–8.0;
B. adjusting the pH of the suspension to about 1.9 to 3.6;
C. removing the gel from the suspension;
D. washing the gel with water until it contains about 20 weight percent or less alkali nitrate, based on the theoretical yield of bismuth vanadate; and
E. calcining the gel at a temperature of from about 200°–500° C. for about 0.4–3 hours.

11. The process of claim 10 wherein the molar ratio of $Bi^{3+}$ to $VO_4^{3-}$ is from about 0.98:1.00 to 1.02:1.00.

12. The process of claim 10 wherein the pH in Step B is adjusted to about 3.3 to 3.5.

13. The process of claim 10 wherein the gel is washed with water until it contains about 5–7 weight percent alkali nitrate.

14. The process of claim 10 wherein the gel is calcined at about 380°–460° C. for about one hour.

15. The process of claim 10 wherein the molar ratio of $Bi^{3+}$ to $VO_4^{3-}$ is about 0.98:1.00 to 1.02:1.00, the pH of the mixture will be about 1.5 to 2.0, the pH in Step B is adjusted to a pH of from about 3.3–3.5, the gel is washed with water until it contains about 5–7% alkali nitrate, and the gel is calcined at a temperature of from about 380°–460° C. for about one hour.

16. The process of claim 15 in which the $Na_3VO_4$ is dissolved in aqueous sodium hydroxide.

17. A bismuth vanadate gel suitable for conversion to pigmentary monoclinic bismuth vanadate prepared by the process of:
A. mixing a solution of $Bi(NO_3)_3.5H_2O$ in nitric acid with a solution of $Na_3VO_4$ in sodium hydroxide, to precipitate a bismuth vanadate gel suspended in a solution containing dissolved sodium nitrate, wherein the molar ratio of $Bi^{3+}$ to $VO_4^{3-}$ is from about 0.95:1.00 to 1.10:1.00, and wherein the normalities of the acid and base solutions are adjusted prior to mixing so that the pH of the mixture will be from about 1.0 to 8.0;
B. adjusting the pH of the suspension to about 1.9 to 3.6;
C. removing the gel from the suspension; and
D. washing the gel with water until it contains about 20 weight percent or less sodium nitrate, based on the theoretical yield of bismuth vanadate.

18. The product produced by the process of claim 17 in which excess water remaining at the conclusion of Step D is removed.

* * * * *